(12) United States Patent
Chuang et al.

(10) Patent No.: US 9,148,404 B2
(45) Date of Patent: Sep. 29, 2015

(54) SYSTEM FOR ACCESSING DATA OF CLOUD DATABASE USING TRANSPARENT TECHNOLOGY

(71) Applicant: SYSCOM COMPUTER ENGINEERING CO., Taipei (TW)

(72) Inventors: Ching-Ju Chuang, Taipei (TW); Pei-Fen Hu, Taipei (TW); Shu-Yuan Hu, Taipei (TW); Kun-Ting Chiu, Taipei (TW)

(73) Assignee: Syscom Computer Engineering Co., Taipei (TW)

( * ) Notice: Subject to any disclaimer, the term of this patent is extended or adjusted under 35 U.S.C. 154(b) by 42 days.

(21) Appl. No.: 14/019,547

(22) Filed: Sep. 6, 2013

(65) Prior Publication Data

US 2015/0074794 A1    Mar. 12, 2015

(51) Int. Cl.
G06F 17/00 (2006.01)
H04L 29/06 (2006.01)
H04L 9/32 (2006.01)
H04L 12/46 (2006.01)

(52) U.S. Cl.
CPC ......... *H04L 63/0218* (2013.01); *H04L 12/4641* (2013.01); *H04L 63/02* (2013.01); *H04L 63/029* (2013.01); *H04L 63/0272* (2013.01); *H04L 63/08* (2013.01)

(58) Field of Classification Search
CPC . H04L 63/0272; H04L 12/4641; H04L 63/08; H04L 63/029; H04L 63/02
USPC ............................... 726/15, 11; 713/153, 168
See application file for complete search history.

(56) References Cited

U.S. PATENT DOCUMENTS

2012/0179904 A1*    7/2012    Dunn et al. ................... 713/155

* cited by examiner

*Primary Examiner* — Aravind Moorthy
(74) *Attorney, Agent, or Firm* — Leong C. Lei (57) ABSTRACT

Disclosed is a system for accessing data of a cloud database via transparent technology, and the system includes at least one channel server and at least one cloud database end. When a connection notice is outputted from an application end, the user channel unit detects a first server address and a first database address in a HTTP data format, and connects to a corresponding channel server via the HTTP tunnel to send a database request, so that the channel server can convert the first database address in the HTTP data format into a TCP/IP data format and then connect to a corresponding database end. Therefore, the application end can access data from the database behind the firewall via the Internet without modifying any program code.

7 Claims, 6 Drawing Sheets

```
while( running ) {
   int rc = 0;
   try {
Socket socket =
serverSocket.accept();

SlaveInfo slave = null;

try
{
InputStream in =
socket.getInputStream();
BufferedReader reader =
new BufferedReader(new
InputStreamReader(in));
String tunneling_server =
reader.readLine();
log.info("tunneling
server="+tunneling_server);
slave =
((ConfigurationManager2)co
if( slave == null )
{
   log.debug("no
information for tunneling
server "+tunneling_server,
null);
   rc = 16; //
ERR_CANT_CON_SRV =
ERR_NET+3;
}
}
catch( Exception e)
{
   log.debug("fail to
connect to connection
manager", e);
   rc = 16; //
ERR_CANT_CON_SRV =
ERR_NET+3;
} long connectionId = -1;
if( rc == 0 )
{
try
{
```

```
connectionId =
openHost(slave.getServerUrl(),
      slave.getHost(),
      slave.getPort(),
      slave.getUser(),
      slave.getPassword());
log.debug( "Connection
opened to Server." );
}
catch(Exception e)
{
   log.debug("fail to
connect to master db", e);
//   e.printStackTrace();
   if( e instanceof
java.net.ConnectException )
rc = 17; //
ERR_CANT_CON_SRV =
ERR_NET+3;
      else
rc = 18;
}
}
OutputStream out =
socket.getOutputStream();
out.write(rc);
out.flush();

if( rc == 0 )
{
if(
configurationManager.isUseStatelessConnection()
) {
   log.debug("Using
ReadWrite Thread.");
   new ProxyReadWrite(
getName() + "-ReadWrite",
configurationManager,
connectionId, socket, slave
).start();
}
}
```

```
while( running ) {
   int rc = 0;
   try {
Socket socket =
serverSocket.accept();

SlaveInfo slave = null;

try

{
InputStream in =
socket.getInputStream();
BufferedReader reader =
new BufferedReader(new
InputStreamReader(in));
String connmgraddr =
reader.readLine();
String dbname =
reader.readLine();
log.info("connection
manager
server="+connmgraddr);
com.dbmaker.ws.client.Connectio
connmgr = new
com.dbmaker.ws.client.Connectio
slave =
connmgr.getSlave(connmgraddr,
dbname);
if( slave == null )
{
    log.debug("no
information for tunneling
server
"+tunneling_server, null);
    rc = 16; //
ERR_CANT_CON_SRV =
ERR_NET+3;
}
}
catch( Exception e )
{
    log.debug("fail to
connect to connection manager", e);
    rc = 16; //
ERR_CANT_CON_SRV =
ERR_NET+3;
}
```

```
long connectionId = -1;
if( rc == 0 )
{
try
{
connectionId =
openHost(slave.getServerUrl(),
    slave.getHost(),
    slave.getPort(),
    slave.getUser(),
    slave.getPassword());
log.debug( "Connection
opened to Server." );
}
catch(Exception e)
{
    log.debug("fail to
connect to master db", e);
//   e.printStackTrace();
    if( e instanceof
java.net.ConnectException
)
rc = 17; //
ERR_CANT_CON_SRV =
ERR_NET+3;
    else
rc = 18;
}
}
OutputStream out =
socket.getOutputStream();
out.write(rc);
out.flush();

if( rc == 0 )
{
// Start the proxy threads.
if(
configurationManager.isUseStatele)
{
    log.debug("Using
ReadWrite Thread.");
    new ProxyReadWrite(
getName() +
"-ReadWrite",
configurationManager,
connectionId, socket,
slave ).start();
}
}
```

Fig. 6

SYSTEM FOR ACCESSING DATA OF CLOUD DATABASE USING TRANSPARENT TECHNOLOGY

BACKGROUND OF THE INVENTION

1. Field of the Invention

The present invention relates to the field of accessing data of a cloud database, and more particularly to a system for accessing data of a cloud database via transparent technology, wherein after data of a Transmission Control Protocol/Internet Protocol (TCP/IP) format are converted into data of a Hyper Text Transmission Protocol (HTTP) format, the data are transmitted to a server through a channel, and then the HTTP format is converted back to the TCP/IP format before the data are transmitted to a cloud database end in order to break through the blocking of a firewall and transmit the data successfully.

2. Description of the Related Art

Open Data Base Connectivity (ODBC) built on the client-server architecture provides a standard Application Programming Interface (API) for transmitting a Structured Query Language (SQL) instruction to access data from a remote-end database through a network layer. The ODBC creates the possibility of using an open database, and the architecture of the ODBC is mainly divided into four units, respectively: application, driver manager, driver and data source. The application externally provides users a talking interface, and internally executes a data preparation, calls an ODBC program function, transmits a SQL instruction, and receives and displays results returned from the database. The driver manager and the driver are dynamic link library (dll) files, and the driver manager assists the application to load the source driver and connect to the data source, and the driver is mainly provided for executing a relative ODBC function and communicating with the corresponding data source. When the application calls an ODBC function such as SQLConnect or SQLDriverConnect, the driver manager will load the relative driver and call the application, so that the application can complete the connection by a corresponding driver without the need of considering the type of data source.

Obviously, the ODBC creates the independent characteristic between the application and the database. However, in the aforementioned client-server architecture, the application requires maintaining an uninterruptable smooth connection before Commit, Rollback or Timeout completes. Now, if the database is hidden behind a firewall for the purpose of network security, the application will be unable to use the original driver directly to connect the database, but it will use a VB6 or a PHP language to edit the program code of the driver and the function installed in the driver manager, and further use the TCP/IP architecture to build another communication channel before breaking through the firewall to complete the connection, and thus causing difficulties and inconvenience to the application. In addition, if the database is a cloud system, then the level of complexity of editing the program code and the function will become higher, and thus affecting the quality of accessing data of the database.

To overcome the aforementioned problem, it is a main subject of the present invention to create an additional channel by using the present common HTTP tunneling to break through the firewall of the network, so as to connect to a cloud database behind a firewall without modifying that the program code and function of the application.

SUMMARY OF THE INVENTION

In view of the problems of the prior art, it is a primary objective of the present invention to provide a system for accessing data of a cloud database via transparent technology, and the system connects to a cloud database behind a firewall by using a HTTP tunnel and allows users to access data without requiring the modification of any program code of the application, so as to improve the operating convenience and the using satisfaction of the application.

To achieve the aforementioned objectives, the present invention provides a system for accessing data from a cloud database via transparent technology, and the system is applied in a client-server architecture and comprises an application end and at least one cloud database end, and provided for the application end to access data from the database behind a firewall via the Internet without requiring any modification of a program code, characterized in that the application end pre-executes a first database configuration file, and the system for accessing data of a cloud database via transparent technology comprises a user channel unit and at least one channel server, and the user channel unit pre-executes a second database configuration file to obtain an address list and connect to the application end, and the address list contains at least one first server address and at least one first database address; and when the user channel unit receives a connection notice outputted from the application end, the address list is inquired to obtain the first server address and the first database address in the HTTP data format according to the connection notice, and a HTTP tunnel is provided for transmitting a database request containing the first database address to the channel server through the firewall connected to the channel server of the first server address, so that the channel server can analyze the database request and convert the first database address in the HTTP data format to a TCP/IP data format, and then complete a connection between the application end and the database end according to the first database address in the TCP/IP data format corresponding to the database end, so as to complete the connection between the application end and the database end.

Wherein, the application end supports an Open Data Base Connectivity (ODBC) driver capable of connecting a plurality of database ends simultaneously, and the user channel unit and the channel server create the HTTP tunnel by using the Socket Over Http Tunneling (SOHT) technology. The application end pre-executes the first database configuration file to designate a port for connecting the user channel unit, so that when the user channel unit receives the connection notice, the application end is connected to a network through the port, so that users can access data with the database end by installing and executing the configuration file without requiring any modification of the complicated program code of the application end.

If there are more than one database end, the system for accessing data of a cloud database via transparent technology further comprises a connection management server, and the connection management server connects to the user channel unit through the firewall by the HTTP tunnel. The connection management server pre-executes a third database configuration file to obtain the address list and record the first server address and the first database address. When the user channel unit receives the connection notice, an acknowledge instruction is outputted, so that when the connection management server detects the using status of each the database end to obtain the database end capable of providing the best service, the connection management server captures the corresponding first server address and first database address from the address list to produce the second server address and the second database address to be fed back to the user channel unit, so that the user channel unit can output the database request and the second database address to the channel server corresponding to the second server address through the HTTP Tunnel. The channel server analyzes the database request and converts the second database address in the HTTP data format into a TCP/IP data format, and then connects to the database end corresponding to the second database address, so as to complete the connection between the application end and the database end.

In summation, the present invention applies the conventional HTTP transparent technology to a database management system and uses the user channel unit and the channel server to create the HTTP Tunnel while converting the data format, so that data in the HTTP format can break through the firewall easily to transmit the data to cloud database or read data from the cloud database. Regardless of the cloud database having or not having the firewall for the network security purpose, the present invention allows users to access data of the database end directly, after completing the setup of the configuration files without requiring any modification of the program code of the application end, so that the invention can ensure the network security of the database as well as the convenience of users' operation. In addition, if the database end is not hidden behind the firewall, the present invention still allows the application end to connect to the database end directly through the original TCP/IP.

DETAILED DESCRIPTION OF THE PREFERRED EMBODIMENTS

The technical content of the present invention will become apparent with the detailed description of preferred embodiments and the illustration of related drawings as follows.

Figure 1:
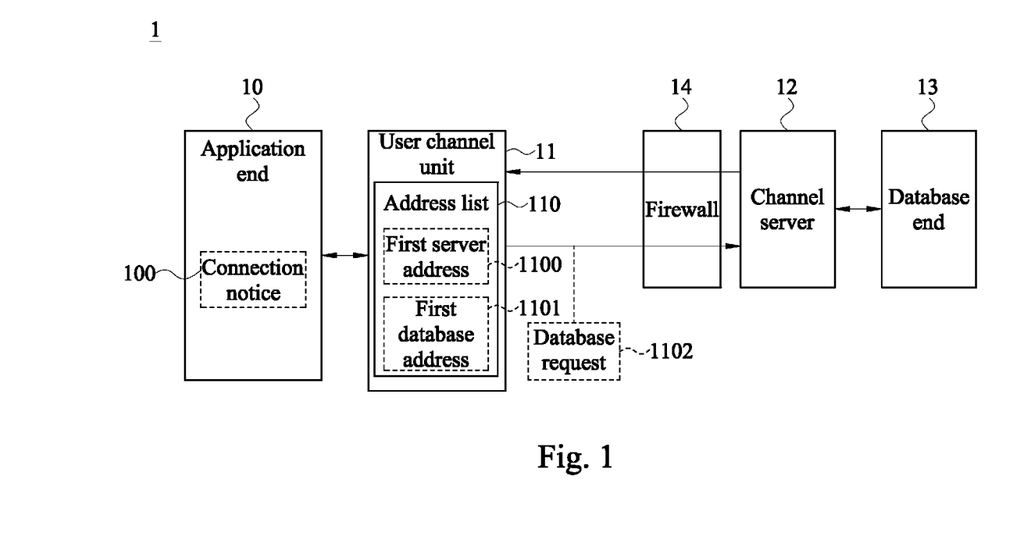
FIG. 1 is a schematic view of a first implementation mode of a preferred embodiment of the present invention.
Figure 2:
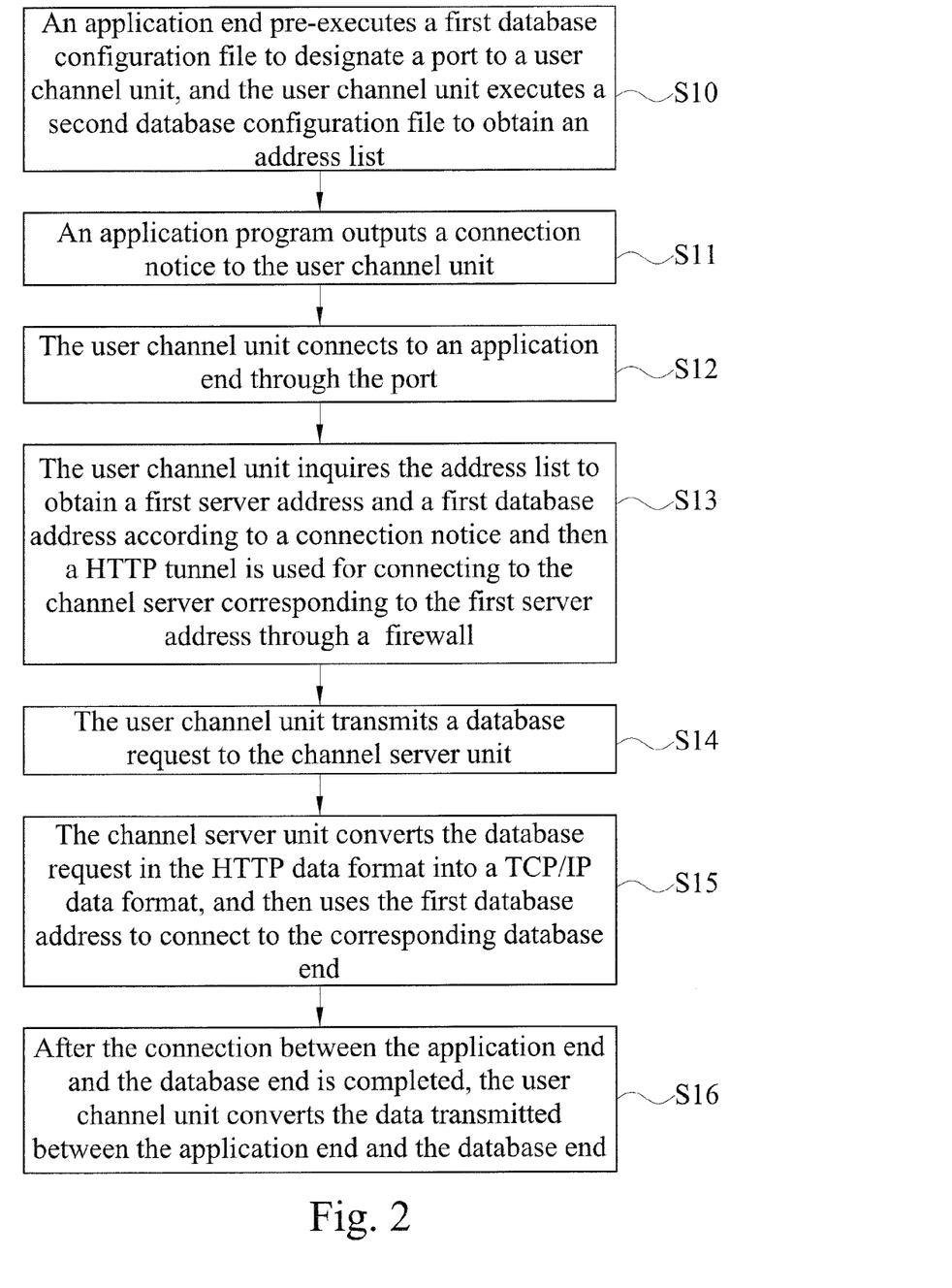
FIG. 2 is a flow chart of the first implementation mode of a preferred embodiment of the present invention.

With reference to FIGS. 1 and 2 for a schematic view and a flow chart of the first implementation mode of a preferred embodiment of the present invention respectively, the system for accessing data of a cloud database via transparent technology 1 is applied in a client-server architecture and comprises an application end 10, a user channel unit 11, at least one channel server 12 and at least one cloud database end 13; and wherein a firewall 14 is built between the user channel unit 11 and the channel server 12. The application end 10 supports an ODBC driver and connects to the user channel unit 11 through TCP/IP. The user channel unit 11 and the channel server 12 create a HTTP Tunnel between them by using the SOHT technology to break through the firewall 14 for a connection with each other. The channel server 12 connects to the database end through TCP/IP. The system 1 allows the application end 10 to access data from the database 13 behind the firewall 14 via the Internet without requiring any modification of the program code according to the following procedure:

Step S10: The application end 10 pre-executes a first database configuration file:
DB_CLOUD=1
DB_CLOUDSVR=172.16.220.116:8085
DB_PTNUM=12345
DB_SVADR=127.0.0.1
DB_USRID=SYSADM,
to designate a port: 12345 to the user channel unit 11. In the meantime, the user channel unit 11 executes a second database configuration file:
client.port=12345
soht.server=http://172.16.220.116:8085/soht/service
remote.db=DBSAMPL5
remote.address=172.16.220.114
remote.port=2455
soht.user=dbmaker
soht.password=17213404707901524517804317611815 2139186000155185142087 242084
soht.server=http://127.0.0.1:8080/soht/service
remote.db=TESTDB
remote.address=172.16.220.56
remote.port=33557
soht.user=dbmaker,
to know the port of the application end 10 and obtain an address list 110, wherein the address list 110 comprises a first server address 1100 such as 172.16.220.116:8085 and 127.0.0.1:8080, and a first database address 1101 such as 172.16.220.114:2455 and 172.16.220.56:33557.

Step S11: When the application end 10 wants to connect to the database end 13, a connection notice 100 in a TCP/IP data format is outputted to the user channel unit 11, so that the user channel unit 11 executes the following instruction:

java-Dclouddb.properties='c:/ . . . /clouddb.properties'-jar cloud-client.jar before entering into an operating status.

Figure 3:
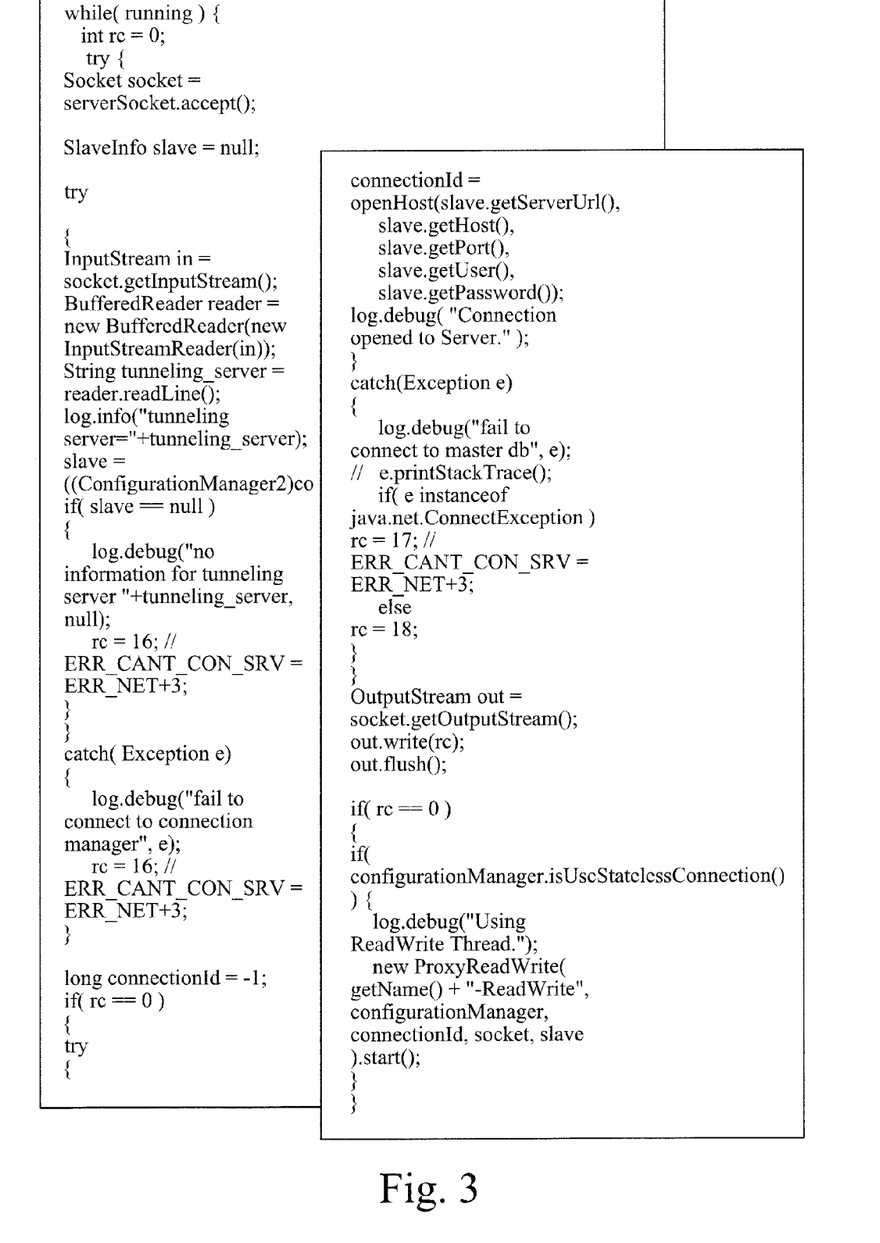
FIG. 3 shows the program code of a user channel unit in accordance with the first implementation mode of a preferred embodiment of the present invention.

Step S12: The user channel unit 11 as shown in FIG. 3 receives the connection notice 100 and then connects to the application end 10 through a fixed port via a network.

Step S13: The address list 110 is inquired to obtain the corresponding first server address 1100 and the first database address 1101 in the HTTP data format according to the connection notice 100, and then the HTTP Tunnel is used to connect to the channel server 12 corresponding to the first server address 1100 through the firewall 14.

Step S14: The user channel unit 11 transmits a database request 1102 to the channel server 12, and the database request 1102 contains the first database address 1101.

Step S15: The channel server 12 receives and analyzes the database request 1102 to convert the database request 1102 in the HTTP data format into a TCP/IP data format, and then connects to the corresponding database end 13 according to the first database address 1101 in the TCP/IP data format.

Step S16: After the connection between the application end 10 and the database end 13 is completed, the user channel unit 11 converts the data transmitted from the application end 10, to transmit the data to the database end 13 via the channel server 12, or to convert and transmit the data of the database transmitted from the channel server 12 to the application end 10 via the channel server 12.

Figure 4:
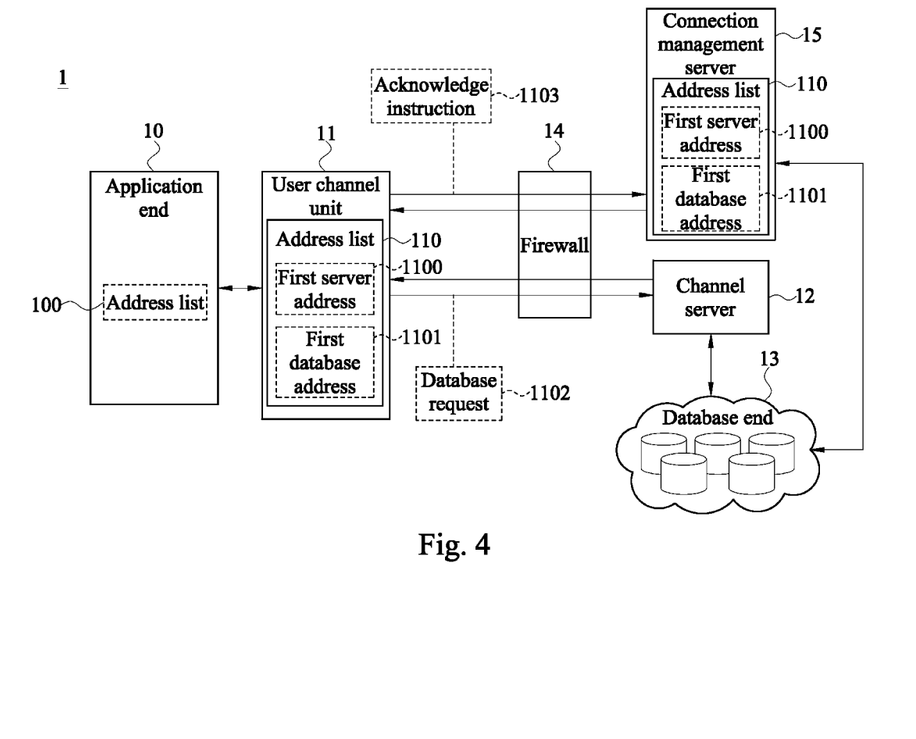
FIG. 4 is a schematic view of a second implementation mode of a preferred embodiment of the present invention.

When more than one database end 13 are used, and the issues of different database ends 13 having different data loads, network transmission rates and computing performance are taken into consideration, the system 1 as shown in FIG. 4 further comprises a connection management server 15. The connection management server 15 also uses the SOHT technology to create another a HTTP Tunnel with the user channel unit 11 for breaking through the firewall 14 in order to connect with each other, so that the system 1 can be operated as shown in the flow chart of FIG. 5.

Figure 5:
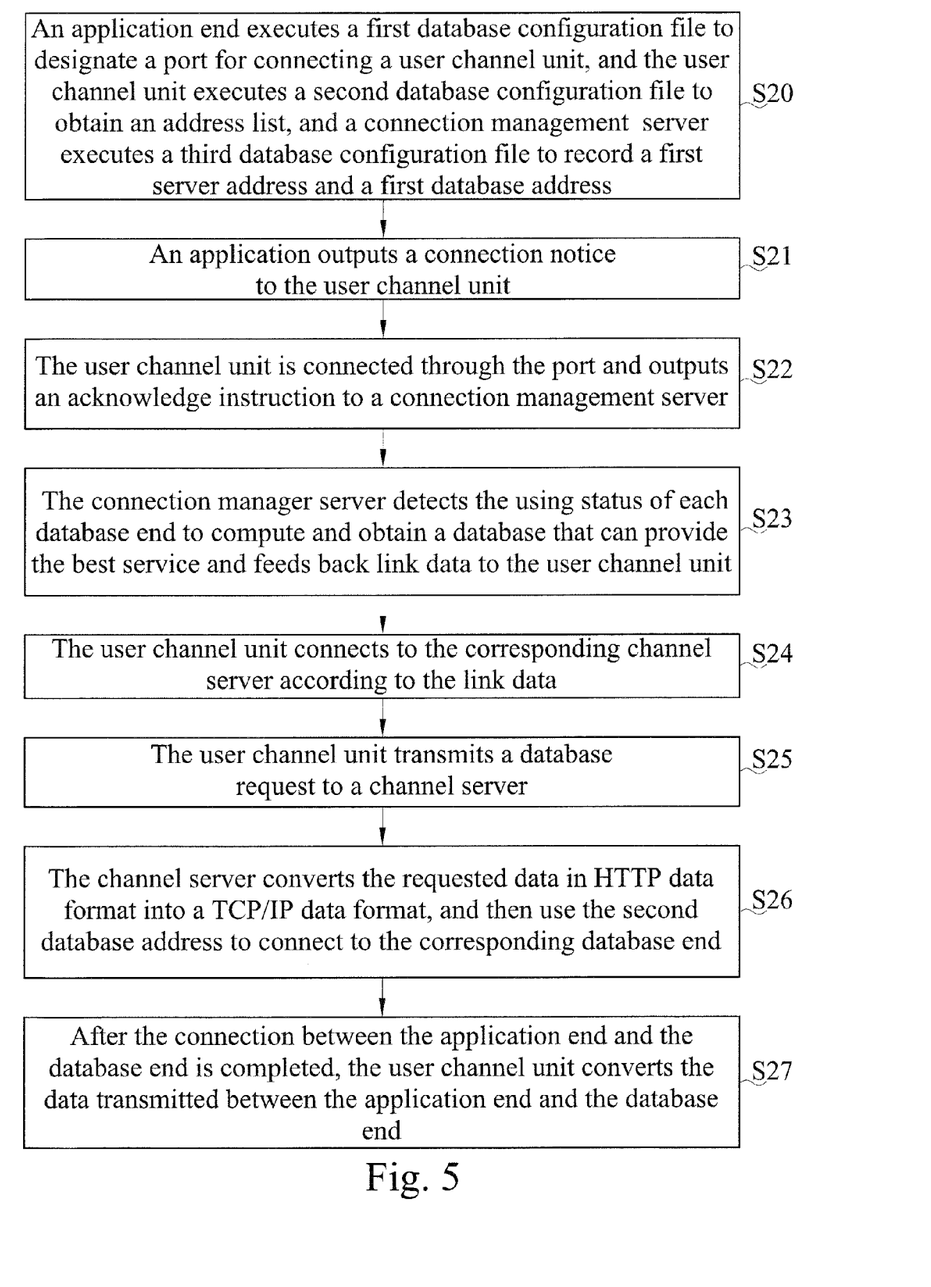
FIG. 5 is a flow chart of the second implementation mode of a preferred embodiment of the present invention.

Step S20: The application end 10 pre-executes the first database configuration file to designate the port for connecting the user channel unit 11, and the user channel unit 11 executes the second database configuration file to know the port of the application end 10 and obtain the address list 110. In the meantime, the connection management server 15 executes a third database configuration file:

soht.server=http://172.16.220.116:8085/soht/service
    remote.db=DBSAMPL5
    remote.address=172.16.220.114
    remote.port=2455
    soht.server=http://127.0.0.1:8080/soht/service
    remote.db=TESTDB
    remote.address=172.16.220.56
    remote.port=33557 to obtain the address list 110 and record the first server address 1100 and the first database address 1101.

Step 21: When the application end 10 wants to connect to the database end 13, the connection notice 100 is outputted to the user channel unit 11, so that the user channel unit 11 executes the following instruction:

java-Dclient.port=12345-jar cloud-client.jar before entering into the operating status.

Figure 6:
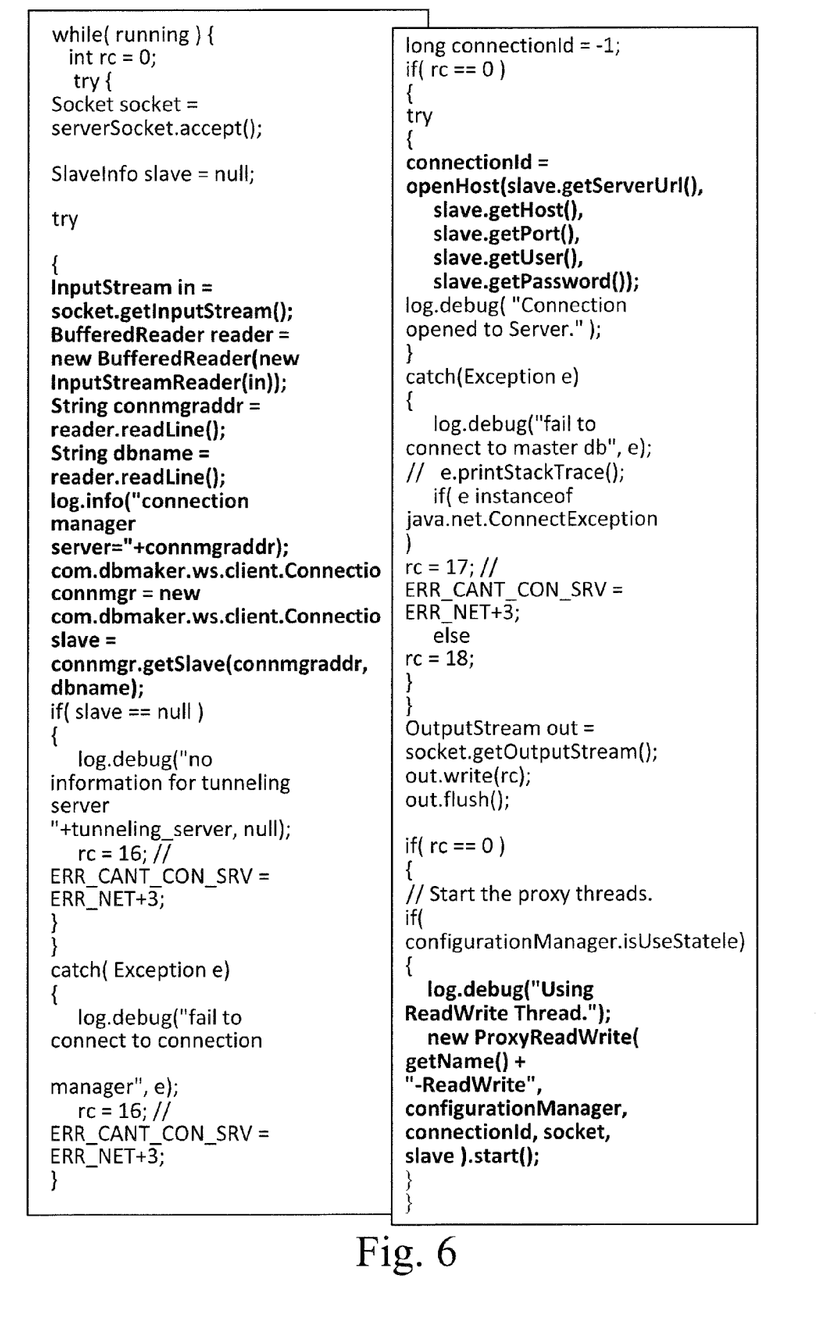
FIG. 6 shows the program code of a user channel unit in accordance with the second implementation mode of a preferred embodiment of the present invention.

Step S22: The user channel unit 11 as shown in FIG. 6 uses a fixed port to connect the application end 10 via a network and outputs an acknowledge instruction 1103 to the connection management server 15, so that the connection management server 15 enters into the following step S23.

S23: The using status of each database end 13 is detected to compute and obtain the database end 13 capable of providing the best service, and then the corresponding first server address 1100 and first database address 1101 are captured from the address list 110 to produce a second server address and a second database address respectively, and feeds link data to the user channel unit 11, wherein the link data include a device name of the database end 13 capable of providing the best service, the second database address and the second server address, and the second database address and the second server address are in the HTTP data format.

Step S24: The user channel unit 11 uses the second server address to connect the corresponding channel server 12 directly through the HTTP Tunnel according to the link data.

Step S25: The user channel unit 11 transmits the database request 1102 to the channel server 12, and the database request 1102 contains the second database address based on the receive result of the link information.

Step S26: The channel server 12 receives and analyzes the database request 1102 to convert the requested data in the HTTP data format into a TCP/IP data format, and connects to the database end 13 according to the second database address.

Step S27: After the connection between the application end 10 and the database end 13 is completed, the user channel unit 11 converts the data transmitted from the application end 10, and transmits the data to the database end 13 via the channel server 12, or converts and transmits the data of the database from the channel server 12 to the application end 10.

In this preferred embodiment, the application end 10 still can use the original TCP/IP network chain to connect the corresponding database end 13 even if the database end 13 is not hidden behind the firewall 14.

What is claimed is:

1. A system for accessing data of a cloud database via transparent technology, applied in a client-server architecture and comprising an application end and at least one cloud database end, and provided for the application end to access data from the database behind a firewall via the Internet without requiring any modification of a program code, characterized in that the application end pre-executes a first database configuration file, and the system for accessing data of a cloud database via transparent technology comprises a user channel unit and at least one channel server, and the user channel unit pre-executes a second database configuration file to obtain an address list and connect to the application end, and the address list contains at least one first server address and at least one first database address; and when the user channel unit receives a connection notice outputted from the application end, the address list is inquired to obtain the first server address and the first database address in the HTTP data format according to the connection notice, the user channel unit connects to the channel server corresponding to the first server address and transmits a database request containing the first database address to the channel server using a HTTP tunnel and tunneling through the firewall, so that the channel server can analyze the database request and convert the first database address in the HTTP data format to a TCP/IP data format, and then connect to the corresponding database end according to the first database address in the TCP/IP data format and complete a connection between the application end and the database end by tunneling through the firewall.

2. The system for accessing data of a cloud database via transparent technology according to claim 1, wherein the application end supports an open database connectivity driver.

3. The system for accessing data of a cloud database via transparent technology according to claim 2, wherein the application end pre-executes the first database configuration file to designate a port for connecting the user channel unit, so that when the user channel unit receives the connection notice, the user channel unit is connected to the application end via a network through the port.

4. The system for accessing data of a cloud database via transparent technology according to claim 3, further comprising a connection management server, and a plurality of database ends being in use, and the connection management server connecting to the user channel unit through the firewall and the HTTP tunnel; and the user channel unit outputting an acknowledge instruction when the user channel unit receives the connection notice, so that the connection management server detects the using status of each database end to feed back a second server address and a second database address in a HTTP data format to the user channel unit, and the database request and the second database address are outputted to the channel server corresponding to the second server address through the HTTP Tunnel, and the channel server analyzes the database request and converts the second database address in the HTTP data format into a TCP/IP data format, and then completes a connection between the application end and the database end according to the database end corresponding to the second database address.

5. The system for accessing data of a cloud database via transparent technology according to claim 4, wherein the connection management server pre-executes a third database configuration file to obtain the address list and record the first server address and the first database address, and when the connection management server detects the using status of each database end and knows the database end that can provide the best service, the corresponding first server address and first database address are captured from the address list to respectively produce and feed back the second server address and the second database address to the user channel unit.

6. The system for accessing data of a cloud database via transparent technology according to claim 5, wherein the user channel unit and the channel server creates the HTTP tunnel by using a Socket Over HTTP Tunneling (SOHT) technology.

7. The system for accessing data of a cloud database via transparent technology according to claim 1, wherein when the database end is not behind the firewall, the application directly connects to the database end via the original TCP/IP.

* * * * *